Whitmarsh & Putnam,
Clothes Hook.

N° 61,590. Patented Jan. 29, 1867.

Witnesses:
P. E. Taschenmacher
N. W. Stearns

Inventors:
Henry M. Whitmarsh
Silas S. Putnam

United States Patent Office.

HENRY M. WHITMARSH, OF ABINGTON, MASSACHUSETTS, AND SILAS S. PUTNAM, OF DORCHESTER, MASSACHUSETTS.

*Letters Patent No. 61,590, dated January 29, 1867.*

IMPROVED CLOTHES HOOK.

*The Schedule referred to in these Letters Patent and making part of the same.*

TO ALL WHOM IT MAY CONCERN:

Be it known that we, HENRY M. WHITMARSH, of Abington, in the county of Plymouth, and State of Massachusetts, and SILAS S. PUTNAM, of Dorchester, in the county of Norfolk, and State aforesaid, have invented an Improved Hook for Suspending Clothes and other articles; of which the following is a full, clear, and exact description, reference being had to the accompanying drawings, making part of this specification, in which—

Our invention consists in an improved hook for suspending clothes and other articles, which is so constructed that it may be closed up out of the way, thereby causing it to occupy less space, and particularly adapting it for use in many situations where an ordinary hook would be unsuitable in consequence of its projecting out too far.

To enable others skilled in the art to understand and use our invention, we will proceed to describe the manner in which we have carried it out.

Figure 1:
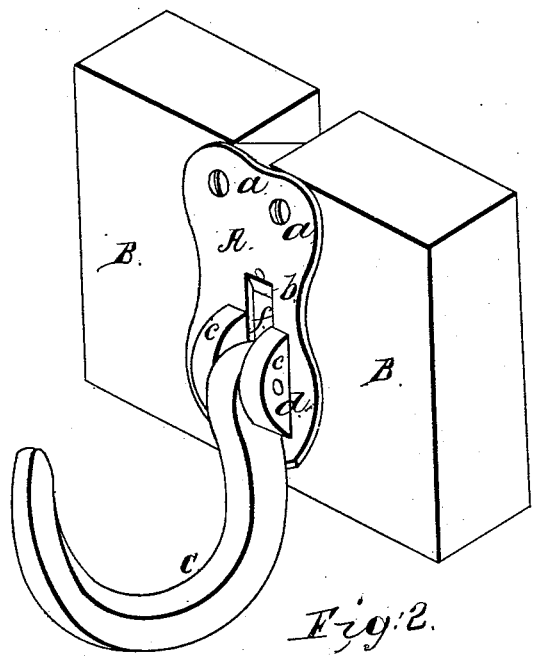
Figure 1 is a perspective view of our improved hook, open, ready for use.
Figure 2:
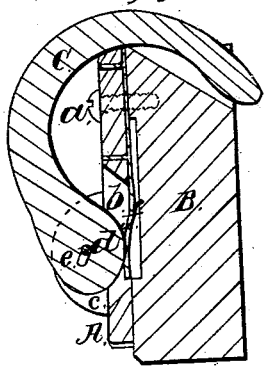
Figure 2 is a central vertical section through the same, closed up.

In the said drawings, A is a plate, which is attached to the strip B by screws, $a$. Through this plate A is cut a slot, $b$, on each side of which is formed a projection, $c$, between which is pivoted the hook C, the pin $d$ passing through a slot, $e$, in the hook. To the under side of the plate A, beneath the slot $b$, is secured a flat spring, $f$, which prevents the hook when down from being easily thrown up in removing an article therefrom. When the hook is thrown over into the position seen in fig. 2, the slot $e$ allows it to drop down slightly, by which it is locked in place, and prevented from being thrown down on pressure being applied near its base in a downward direction, while it may easily be turned over into a position ready for use by taking hold near its point. The spring $f$ may be dispensed with if desired, although we prefer to use it as shown and described. A hook constructed as above described may be readily closed up so as to occupy very little space, thereby adapting it to many places where the ordinary hook would be objectionable on account of its projecting out too great a distance. And our invention may be applied to meat hooks, "water hooks," for harness saddles, and those used for various other purposes.

Claim.

What we claim as our invention, and desire to secure by Letters Patent, is—

The pivoted hook C, with its slot $e$, so arranged that it may be closed up, and thus occupy less space, subtantially as described.

HENRY M. WHITMARSH,
SILAS S. PUTNAM.

Witnesses:
P. E. TESCHEMACHER,
N. W. STEARNS.